United States Patent
Park et al.

(10) Patent No.: US 8,121,650 B2
(45) Date of Patent: Feb. 21, 2012

(54) MENU DISPLAYING METHOD IN A MOBILE TERMINAL

(75) Inventors: Sun-Ae Park, Taegu-Kwangyokshi (KR); Hyun-Soo Kim, Taegu-Kwangyokshi (KR)

(73) Assignee: Samsung Electronics Co., Ltd. (KR)

( * ) Notice: Subject to any disclaimer, the term of this patent is extended or adjusted under 35 U.S.C. 154(b) by 533 days.

(21) Appl. No.: 10/190,640

(22) Filed: Jul. 8, 2002

(65) Prior Publication Data
US 2003/0008686 A1 Jan. 9, 2003

(30) Foreign Application Priority Data
Jul. 9, 2001 (KR) .............................. 2001-0040733

(51) Int. Cl.
*H04M 1/00* (2006.01)
*G06F 3/048* (2006.01)
(52) U.S. Cl. ......... 455/566; 455/418; 715/813; 715/844
(58) Field of Classification Search .................. 455/566, 455/550.1; 345/841, 864; 715/808–810, 715/813, 816, 817, 819–823, 841–845
See application file for complete search history.

(56) References Cited

U.S. PATENT DOCUMENTS

| | | | | |
|---|---|---|---|---|
| 5,689,665 A * | 11/1997 | Mitsui | ............................ | 395/342 |
| 5,751,959 A * | 5/1998 | Sato | ............................... | 395/200 |
| 5,754,798 A * | 5/1998 | Uehara et al. | ................. | 710/104 |
| 6,091,956 A * | 7/2000 | Hollenberg | .................... | 455/456 |
| 6,125,287 A * | 9/2000 | Cushman et al. | .............. | 455/566 |
| 6,177,941 B1 * | 1/2001 | Haynes | .......................... | 345/352 |
| 6,339,780 B1 * | 1/2002 | Shell | ............................. | 707/526 |
| 6,452,579 B1 | 9/2002 | Itoh et al. | | |
| 6,724,402 B1 * | 4/2004 | Baquero | ........................ | 715/765 |
| 2001/0053708 A1 * | 12/2001 | Sugiyama | ..................... | 455/566 |
| 2002/0013830 A1 * | 1/2002 | Stuckman | ..................... | 709/219 |

FOREIGN PATENT DOCUMENTS
KR 1020020092097 A 11/2002
* cited by examiner

*Primary Examiner* — George Eng
*Assistant Examiner* — Marcos Torres
(74) *Attorney, Agent, or Firm* — The Farrell Law Firm, P.C.

(57) ABSTRACT

A menu displaying method in a mobile terminal. When a user opens a menu function, a list of menu items is displayed on a display. Upon user selection of a menu item from the list, the selected menu item is perceivably displayed. It is determined whether a sub-menu of the menu item has been set as status information of the menu item. If the sub-menu has been set as the status information, a bubble window having the status information is displayed near the menu item.

13 Claims, 5 Drawing Sheets

(a)

| Call Records |
|---|
| 1 Missed Calls |
| 2 Rece ⟨No entries⟩ — 300 |
| 3 Dialled Calls |
| 4 Call Time |
| 5 Call Cost |
| Select          1.1 |

(b)

| Call Records |
|---|
| 1 Missed Calls |
| 2 Received Calls |
| 3 Dialle ⟨No entries⟩ — 302 |
| 4 Call Time |
| 5 Call Cost |
| Select          1.2 |

MENU DISPLAYING METHOD IN A MOBILE TERMINAL

PRIORITY

This application claims priority to an application entitled "Menu Displaying Method in Mobile Terminal" filed in the Korean Industrial Property Office on Jul. 9, 2001 and assigned Serial No. 2001-40733, the contents of which are hereby incorporated by reference.

BACKGROUND OF THE INVENTION

1. Field of the Invention

The present invention relates generally to a mobile terminal, and in particular, to a user interfacing method in a mobile terminal.

2. Description of the Related Art

Aside from the traditional voice call function, a portable phone includes a phone book function by which 100 or more names and their phone numbers are memorized, a scheduling function that allows the user to make and manage a calendar of events, and an SMS (Short Message Service) function. As the developmental work of mobile terminals is undertaken toward composite wireless terminals with an emphasis on multimedia service, mobile terminals capable of processing pictures have recently emerged.

One of the ways to optimize the call service and various additional services for a mobile terminal is to provide an active convenient user interface. User interfacing is implemented via a keypad and a display under the control of a controller in a typical mobile terminal. The keypad is comprised of digit keys and function keys and the display displays messages and images under the control of the controller.

As compared to a PC (Personal Computer), the mobile terminal has a smaller display window. Therefore, there is trouble with displaying a full list of menu items in the display window at one time. When the user selects Menu using a specific key, the mobile terminal displays a main menu list on the display. Then, upon user selection of a main menu item using a directional key or/and a function key designated for sub-menu selection, the mobile terminal displays a sub-menu list under the main menu on the display.

Multiple key pressings are required for the user to check the status information of the terminal or the status information of his intended menu item. For example, the user must go through sub-menus one by one under the menu item using function keys such as a Menu key, a Send key, and directional keys. If the user wants to select another menu item, the user must exit to the previous higher menu level, shift to the higher menu level of his target menu item, select it, and then come down to the target menu item.

Such menu surfing is confusing and troublesome to the user and causes an increase in power dissipation.

SUMMARY OF THE INVENTION

It is, therefore, an object of the present invention to provide a user-friendly menu displaying method in a mobile terminal.

It is another object of the present invention to provide a menu displaying method in a mobile terminal, which allows a user to search for his intended menu item with a reduced menu surfing requirement and reduced power consumption.

To achieve the above and other objects, there is provided a menu displaying method in a mobile terminal. According to one aspect of the present invention, when a user opens a menu function, a list of menu items is displayed on a display. Upon user selection of a menu item from the list, the selected menu item is perceivably displayed. It is determined whether a sub-menu of the menu item has been set as status information of the menu item. If the sub-menu has been set as the status information, a bubble window having the status information is displayed near the menu item.

According to another aspect of the present invention, upon user selection of a menu item, it is determined whether the selected menu item has status information as a sub-menu of the menu item. If the menu item has the first status information, a bubble window having first status information is displayed in such a position that the bubble window does not overlap the menu item while the menu item is displayed. If the user requests the first status information to be changed, the first status information is replaced with second status information selected by the user and the second status information is set for the menu item while the bubble window is displayed.

BRIEF DESCRIPTION OF THE DRAWINGS

The above and other objects, features and advantages of the present invention will become more apparent from the following detailed description when taken in conjunction with the accompanying drawings in which:

FIGS. 3A and 3B illustrate exemplary menu windows displaying highlighted menu items without any lower entries and their status information according to the embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
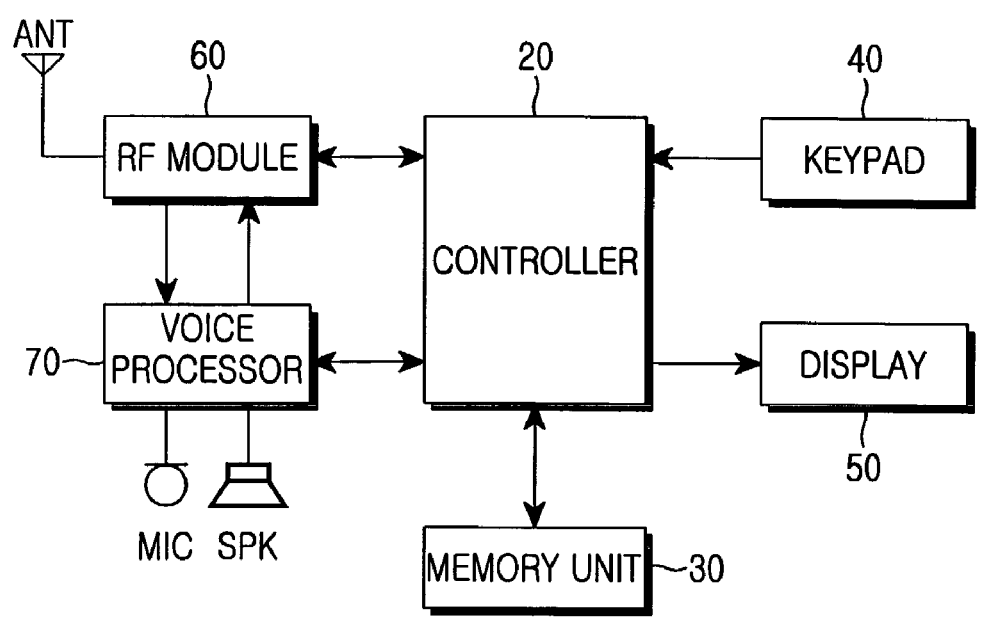
FIG. 1 is a block diagram of a mobile terminal according to an embodiment of the present invention.

Referring to FIG. 1, a controller 20 provides overall control to the mobile terminal. An RF (Radio Frequency) module 60 takes charge of transmission and reception of voice data and control data under the control of the controller 20. A voice processor 70 converts voice data received from the RF module 60 to audible voice and outputs it through a speaker SPK, and converts a voice signal received through a microphone MIC to voice data and outputs it to the RF module 60 under the control of the controller 20. A keypad 40, including digit keys and function keys, feeds key input data corresponding to a key pressed by a user to the controller 20. A display 50 displays messages under the control of the controller 20. A memory unit 30 includes a data memory for storing program data needed for the operation of the mobile terminal and data generated during a user-requested operation.

A main feature of the present invention is that if the sub-menus of a menu item highlighted by default or by user selection are set as the status information of the menu item, a bubble window displaying the status information is displayed near the menu item in a menu window without any specific key input from the user for selection of a sub-menu item, and the user is allowed to directly change the status information in the bubble window.

Figure 2:
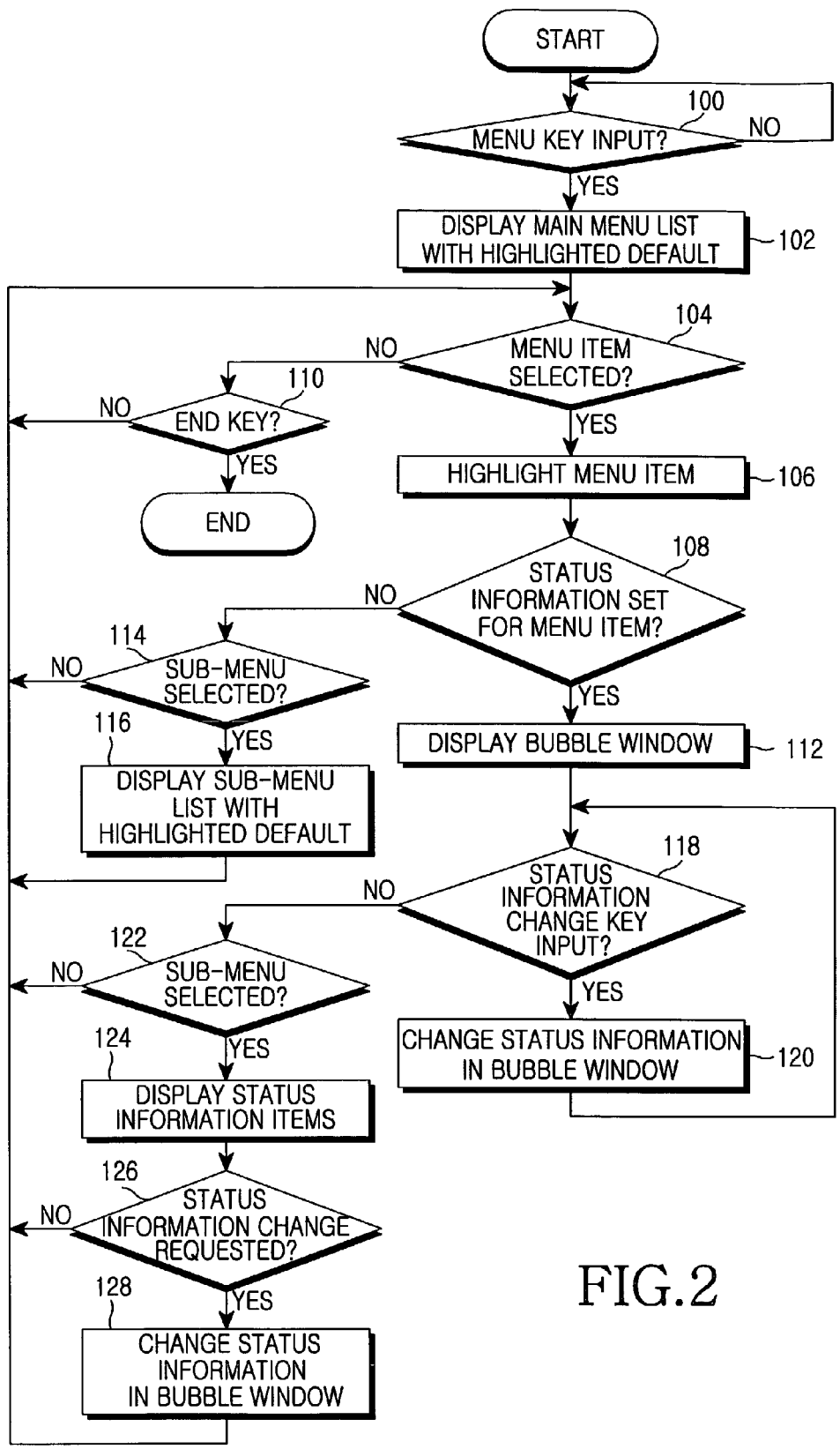
FIG. 2 is a flowchart illustrating a control operation for menu displaying in the mobile terminal according to the embodiment of the present invention.
Figure 4:
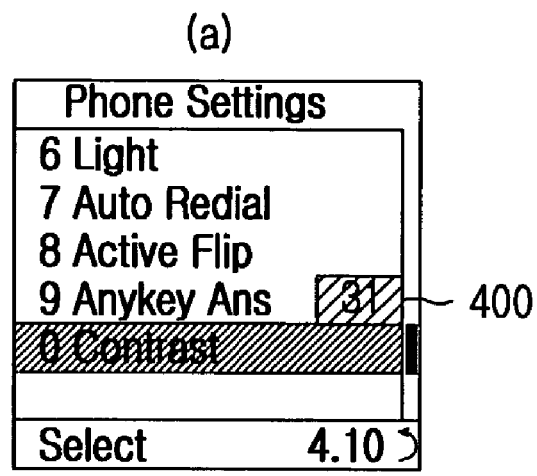
FIGS. 4A and 4B illustrate exemplary menu windows displaying highlighted menu items with their status information according to the embodiment of the present invention.
Figure 4:
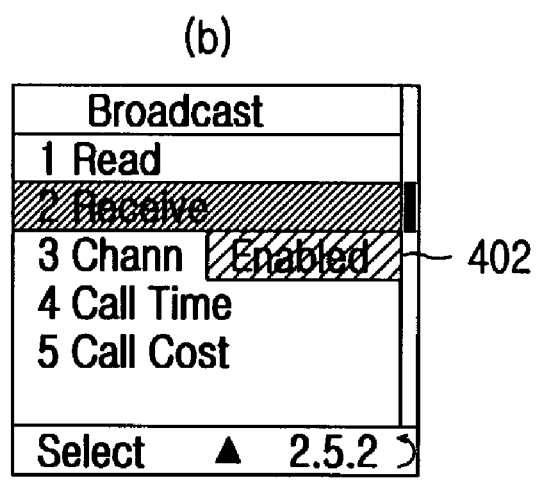
Figure 5:
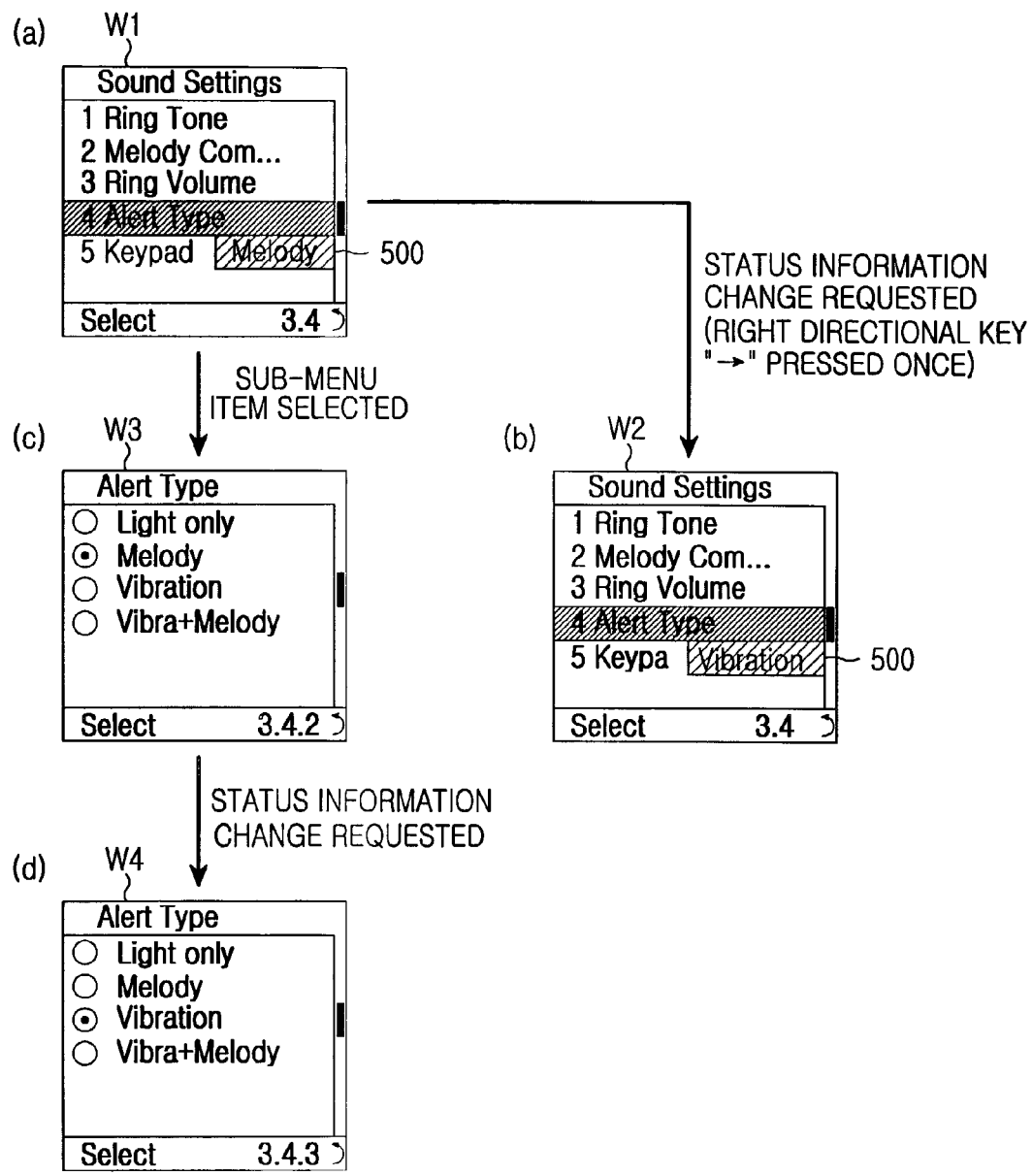
FIG. 5 illustrates changes in the status information of a highlighted menu item in a menu window according to the embodiment of the present invention.

FIG. 2 is a flowchart illustrating a control operation for menu displaying in the mobile terminal according to the embodiment of the present invention. FIGS. 3A and 3B illustrate exemplary menu windows displaying highlighted menu items without any lower entries and their status information, FIGS. 4A and 4B illustrate exemplary menu windows displaying highlighted menu items with their status information, and FIG. 5 illustrates changing the status information of a highlighted menu item in a menu window according to the embodiment of the present invention.

A menu displaying method according to the embodiment of the present invention will be described in detail herein below with reference to FIGS. 1 to 5.

When the user presses the Menu key in step 100, the controller 20 displays a list of main menu items and highlights a default main menu item in step 102. According to the embodiment of the present invention, a menu item is highlighted by default or by user selection to notify the user that the menu item has been selected. Animation or symbols may be used instead of the menu item highlight.

With the main menu list displayed on the display 50, the user presses a directional key to select one of the main menu items in step 104 and then the selected main menu item is highlighted in step 106. Upon receipt of key input corresponding to an END key in step 110, on the other hand, the controller 20 terminates the menu displaying procedure.

After step 106, the controller 20 determines whether a sub-menu of the highlighted menu item has been set as its status information in step 108. The status information indicates "no-entries" of the menu item (i.e., it has no submenus) or the current setting status of the menu item. If the sub-menu of the menu item is given as its status information, the controller 20 invokes a bubble window displaying the status information without overlapping with the menu item a predetermined time after the highlighting time in step 112. The background of the bubble window is made preferably light gray. The bubble window will be described later referring to FIGS. 3A and 3B and FIG. 5.

By performing steps 108 and 112, the user can perceive the status information of the highlighted menu item without any more key inputs.

Referring to FIGS. 3A and 3B, bubble windows 300 and 302 display the status information of selected menu items having no sub-menu entries. That is, the bubble window 300 displays "No entries", indicating that a menu item "1 Missed Calls" has no sub-menu entries, and the bubble window 302 displays "No entries", indicating that a menu item "2 Received Calls" has no sub-menu entries.

Referring to FIGS. 4A and 4B, bubble windows 400 and 402 display "31" for a menu item "0 Contrast" and "Enabled" for a menu item "2 Receive", respectively. The status information indicate that the present contrast level is 31 and the mobile terminal is enabled to broadcast reception, respectively.

With the bubble window invoked in step 112, the user can change the status information in the bubble window in two ways. One is to directly change the status information without selecting a sub-menu (steps 118 and 120), and the other way is to select a sub-menu to change it (steps 122 to 128).

In order to change the status information in the bubble window without selecting a sub-menu, the user presses a key designated for status information changing, a left or right directional key in the embodiment of the present invention. The left directional key scrolls up the status information, and the right directional key scrolls down the status information. If two status information values are set, they are toggled each time the left and right directional keys are pressed. When at least three status information values are set for a menu item, it is preferable to display them in a bubble window in a ring-counter manner by input of the left and right directional keys.

In step 118, the controller 20 determines whether the left or right directional key has been pressed. Upon input of the left or right directional key, the controller 20 changes the status information in the bubble window to selected status information in step 120. Referring to FIG. 5, in a menu window W1, a bubble window 500 for a menu item "4 Alert Type" displays the present alert type as "Melody". If the user presses the right directional key once, "Melody" is replaced by "Vibration" in a menu window W2. The changed status information is stored in the memory. Then, the controller 20 returns to step 118.

Meanwhile, the user can change the status information by selecting a sub-menu from a list of status information items in steps 122 to 128. With the menu window W1 displayed, for example, the controller 20 determines whether the left or right directional key has been pressed in step 118. If either of the directional keys has not been received, the controller 20 determines whether a key designated for selecting a sub-menu, such as a Send key in the embodiment of the present invention, has been pressed in step 122. Upon input of the Send key, the controller 20 displays a menu window W3. If the user requests the change of the status information to his intended status information, for example, "Melody" to "Vibration" by pressing an up directional key once in step 126, the controller 20 displays a menu window W4 with the changed status information and stores the changed status information in the memory in step 128. Then, the controller 20 returns to step 104.

If the sub-menu of the menu item is not set as its status information in step 108, the controller 20 determines whether the user has selected a sub-menu of the menu item in step 114. Upon user selection of a sub-menu, the controller 20 displays a list of sub-menu items and highlights a default sub-menu item in step 116 and then returns to step 104.

In accordance with the present invention as described above, if the submenus of a selected menu item have been set as the status information values of the menu item, the current status information of the menu item is displayed in a bubble window, thereby facilitating a quick status information check and reducing the number of required key strokes. Furthermore, a user is allowed to change the status information directly in the bubble window.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for displaying a menu in a mobile terminal, the method comprising the steps of:

displaying, on a display, a selected menu item from a list of menu items, upon a user selection, and highlighting the selected menu item;

determining key direction corresponding to a user key input; and indicating on a bubble window, concurrently with the display of the selected menu item, a selected sub entry of the selected menu item, the selected sub entry being preset corresponding to the inputted key direction in selectable sub entries for the selected menu item without displaying any other selectable sub entries, wherein when it is determined that a sub-menu of the selected menu item has been set as status information of the selected menu item, the bubble window displays the status information of the selected menu item without overlapping with the selected menu item a predetermined time after the highlighting of the selected menu item.

2. The method of claim 1, further comprising changing, upon a user input, the selected sub entry of the selected menu item to another one of the alternatively selectable sub entries while the bubble window is displayed.

3. The method of claim 2, wherein the sub entry change is performed by pressing a directional key.

4. The method of claim 2, wherein an activation or deactivation of the bubble window is selectable by a user key input.

5. The method of claim 1, wherein the selected sub entry among the alternatively selectable sub entries is selected and changed as a status information by pressing a directional key once.

6. A method for displaying a menu in a mobile terminal, the method comprising the steps of:
displaying, on a display, a selected menu item from a list of menu items upon a user selection, and highlighting the selected menu item;
determining key direction corresponding to a user key input; and
indicating on a bubble window, concurrently with the display of the selected menu item, a sub entry status of the selected menu item, wherein the sub entry status indicates no entry, the sub entry is preset corresponding to the inputted key direction in selectable sub entries for the selected menu item without displaying any other selectable sub entries,
wherein when it is determined that a sub-menu of the selected menu item has been set as status information of the selected menu item, the bubble window displays the status information of the selected menu item without overlapping with the selected menu item a predetermined time after the highlighting of the selected menu item.

7. The method of claim 6, wherein an activation or deactivation of the bubble window is selectable by a user.

8. The method of claim 6, wherein the selected sub entry among the alternatively selectable sub entries is selected and changed as a status information by pressing a directional key once.

9. A mobile terminal for displaying a menu comprising:
a display for displaying a list of menu items;
a keypad for receiving a user selection; and
a controller coupled to the display and the keypad, wherein the display is adapted to display and highlight a selected menu item from the list of menu items upon an user selection and determines key direction corresponding to a user key input and indicate on a bubble window, concurrently with the display of the selected menu item, a selected sub entry of the selected menu item, the selected sub entry is preset corresponding to the inputted key direction in selectable sub entries for the selected menu item without displaying any other selectable sub entries,
wherein when it is determined that a sub-menu of the selected menu item has been set as status information of the selected menu item, the bubble window displays the status information of the selected menu item without overlapping with the selected menu item a predetermined time after the highlighting of the selected menu item.

10. The mobile terminal of claim 9, wherein the mobile terminal is adapted to change, upon a user input, the selected sub entry of the selected menu item to another one of the alternatively selectable sub entries while the bubble window is displayed.

11. The mobile terminal of claim 10, wherein the mobile terminal is adapted to perform the sub entry change in response to a directional key input.

12. The mobile terminal of claim 9, wherein the mobile terminal is adapted to activate or deactivate the bubble window by a user key input.

13. The method of claim 9, wherein the selected sub entry among the alternatively selectable sub entries is selected and changed as a status information by pressing a directional key once.

* * * * *